(12) United States Patent
Faisal et al.

(10) Patent No.: US 8,943,189 B2
(45) Date of Patent: Jan. 27, 2015

(54) STANDARD BASED DETECTION AND LAUNCH OF CLIENT APPLICATIONS

(75) Inventors: Adil Faisal, Redmond, WA (US);
Kenneth W. Wickes, Seattle, WA (US);
Amit Kripalani, Kothaguda (IN);
Deepthi Kandimalla, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1818 days.

(21) Appl. No.: 11/750,689

(22) Filed: May 18, 2007

(65) Prior Publication Data
US 2008/0288631 A1    Nov. 20, 2008

(51) Int. Cl.
*G06F 15/16*  (2006.01)
*G06F 9/445*  (2006.01)

(52) U.S. Cl.
CPC ........................................ *G06F 8/67* (2013.01)
USPC .......................................................... 709/224

(58) Field of Classification Search
CPC ......................................................... G06F 8/67
USPC .......................................................... 709/224
See application file for complete search history.

(56) References Cited

U.S. PATENT DOCUMENTS

| | | | |
|---|---|---|---|
| 6,028,998 A | 2/2000 | Gloudeman et al. | |
| 6,546,554 B1 * | 4/2003 | Schmidt et al. | 717/176 |
| 6,976,077 B1 | 12/2005 | Lehew et al. | |
| 6,988,249 B1 | 1/2006 | Arvanitis et al. | |
| 2003/0119386 A1 * | 6/2003 | Laux et al. | 439/894 |
| 2004/0249919 A1 * | 12/2004 | Mattheis | 709/223 |
| 2005/0015439 A1 | 1/2005 | Balaji et al. | |
| 2005/0108678 A1 | 5/2005 | Goodwin et al. | |
| 2006/0136528 A1 * | 6/2006 | Martin et al. | 707/205 |
| 2006/0212548 A1 * | 9/2006 | Faisal et al. | 709/220 |
| 2006/0249567 A1 | 11/2006 | Byrne et al. | |
| 2006/0294196 A1 | 12/2006 | Feirouz et al. | |
| 2007/0226621 A1 * | 9/2007 | Dayan et al. | 715/706 |
| 2008/0098080 A1 * | 4/2008 | Daigle et al. | 709/207 |

OTHER PUBLICATIONS

"Developing Java Client Applications Using Java Web Start and WebSphere Studio" http://java.sys-con.com/read/43848.htm last viewed Mar. 22, 2007, 11 pages.
Huang, et al. "Web Application Security Assessment by Fault Injection and Behavior Monitoring" (2003) ACM, 12 pages.

* cited by examiner

*Primary Examiner* — Bryan Lee
(74) *Attorney, Agent, or Firm* — Andrew Smith; Jim Ross; Micky Minhas (57) ABSTRACT

The claimed subject matter provides a system and/or method that detects, installs and launches applications on client machines. The disclosed system can include a component that receives a request to launch or install a client application. The component detects whether an application is present in a client machine by scrutinizing the received request and extracting an agent string associated with the client application. Based at least in part on the agent string, a server in receipt of the request can distribute a formatted document affiliated with the client application and thereafter initiate the application to execute on the client machine through MIME-type association.

20 Claims, 10 Drawing Sheets

STANDARD BASED DETECTION AND LAUNCH OF CLIENT APPLICATIONS

BACKGROUND

As computing and network technologies have evolved and have become more robust, secure and reliable, more consumers, wholesalers, retailers, entrepreneurs, educational institutions, and the like have and are shifting business paradigms and are employing the Internet to perform business rather than utilizing traditional means. For example, today consumers can access their bank accounts on-line (e.g., via the Internet) and can perform an ever growing number of banking transactions such as balance inquiries, fund transfers, bill payments, and the like.

With the tightening of browser and operating system security it has become increasingly more difficult to detect and launch client applications from browsers with minimal user intervention. To exacerbate matters users can encounter significantly disparate experiences depending on operating system and/or browser security settings. Conventionally, the detection and launch of client applications has involved a combination of nonstandard approaches, such as browser plug-ins, ActiveX, signed Java Applets, etc. to obtain users consent to run client applications on their machines. While such nonstandard approaches may have achieved their ends, such approaches elicited a multitude of additional security dialogs generated by the operating system and/or browser making a user's experience extremely unpleasant, tedious, and daunting. Additionally, conventional means of detecting and launching client applications can significantly compromise computer, operating system, and/or browsers security (e.g., installing ActiveX control, even from trust sources, can open up possibilities for malicious sites to exploit any security holes that might exist in the ActiveX control).

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter in accordance with one illustrative aspect relates to systems and methods that effectuate and facilitate detection, launch, and/or installation of client applications on client machines. More particularly, the subject matter as claimed in one illustrative aspect can comprise a component that receives requests to launch or install applications, wherein the component analyses the request, extracts an agent string associated with the application, and based at least in part on the extracted agent string, distributes a formatted document associated with the application, and thereafter causes the application to commence execution on a client.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
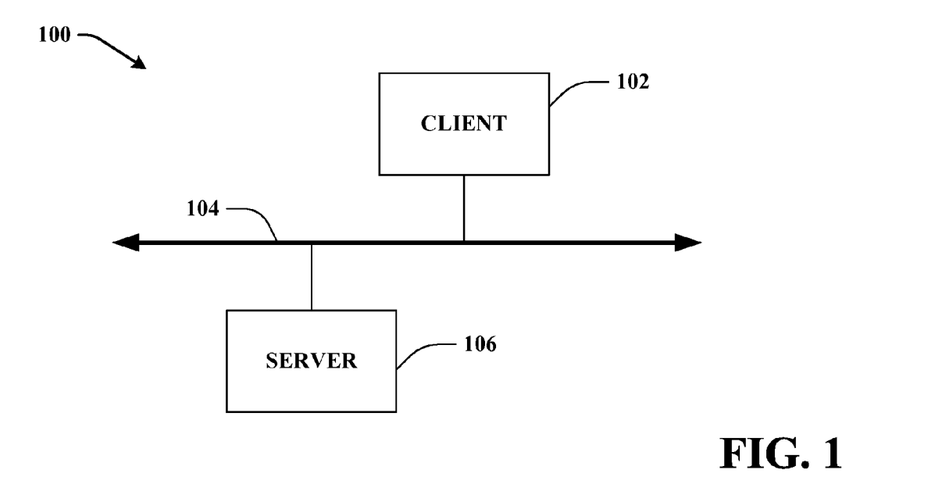
FIG. 1 illustrates a machine-implemented detection, launch and/or installation system in accordance with the claimed subject matter.

FIG. 1 illustrates a system 100 that can effectuate and facilitate detection, launch, and installation of client applications (e.g., web conferencing, word processing, spreadsheet, diagramming, etc.) over a network topology onto client machines. As illustrated, system 100 includes client 102 that can be any type of machine that includes a processor. Illustrative machines that can constitute client 102 can include Personal Digital Assistants (PDAs), cell phones, smart phones, laptop computers, notebook computers, consumer devices/appliances, industrial automation devices, automotive components, aviation components, hand-held devices, desktop computers, server computing devices, etc. Client 102, as depicted, can be in continuous and operative, or sporadic communication via network topology 104 with server 106. Network topology 104 can include any viable communication technology, for example, wired and/or wireless modalities and/or technologies can be employed to effectuate the subject matter as claimed. Moreover, network topology 104 can include utilization of Personal Area Networks (PANs), Local Area Networks (LANs), Campus Area Networks (CANs), Metropolitan Area Networks (MANs), Extranets, Intranets, the Internet, Wide Area Networks (WANs)— both centralized and distributed—and/or any combination, permutation, and/or aggregation thereof.

Server 106, like client 102, can be any type of machine that includes a processor and that is capable of effective communication with network topology 104. Machines that can comprise server 106 can include desktop computers, server class computing devices, cell phones, smart phones, laptop computers, notebook computers, Tablet PCs, consumer and/or industrial devices and/or appliances, automotive accessories, aviation equipment, handheld devices, Personal Digital Assistants (PDAs), and the like. Server 106 can receive from client 102, via network topology 104 indication that an individual using client 102 (e.g., utilizing a browser executing on client 102) is trying to launch and/or install a client application (e.g., instant messaging client, web conferencing client, etc.). Upon receipt of indication that client 102, or more particularly, individual or application accessing, utilizing, and/or executing thereon, requires, or is attempting to launch, install, and/or execute an application, or series or suite of applications, server 106 can detect the type of platform (e.g., machine characteristics, operating system, network parameters and coordinates, and other such potent and useful information). Once server 106 has extracted and/or obtained the type of platform from which a request is emanating, server 106 can determine whether the extracted platform type exists in a persisted support list, for example. Where the platform type is found in the persisted support list further launch sequence checks can be performed (as discussed supra). Where server 106 is unable to locate the platform type in the persisted support list a reach console can be spawned and/or displayed on client 102 whereupon further pertinent information can be elicited from the individual using client 102, and/or the process/application attempting to launch the client application on client 102.

Where server 106 establishes that platform type exists in the persisted support list. For instance, server 106 can attempt, from information supplied by client 102, to uncover an associated agent string. An agent string can take the form "<client-app-name>/<version-number>", for instance. For example, agent string "XYZ 8.0.1234.0" can indicate client application XYZ version 8.0.1234.0.

If server 106 detects and/or recognizes an agent string associated with the request received from client 102, a file (e.g., in a real-time collaboration file format with an .rtc extension) can be distributed to client 102 and the client application launched thereafter.

Where, on the other hand, server 106 fails to detect and/or recognize an agent string associated with the received request from client 102, server 106 can undertake investigation as to whether client 102 has previously been associated with a cookie (e.g., a browser cookie with a relevant string representing the client application, such as, for instance, "XY4799Installed", has previously been persisted on client 102) and/or an appropriate MIME (e.g., Multipurpose Internet Mail Extensions) type, such as for example, "application/vnd.xy-rtc", has heretofore been persisted and/or affiliated with client 102. Where server 106 uncovers the presence of either an appropriate cookie and/or MIME type, server 106 can disseminate a real-time collaboration formatted file (e.g., a file with an .rtc extension) to client 102 and thereafter the client application can be launched to execute on client 102.

Where server 106 is unable to discern either an agent string, a cookie, and/or a MIME type, server 106 can be reasonably certain of the absence of a client application in client 102. Server 106 can then deploy an installer facility that may take into consideration a user's location (e.g., locale) and/or the geographical location of client 102. At this point, server 106 can elicit a response from individuals utilizing client 102 as to whether or not to install the requested client application on client 102. Alternatively and/or additionally, server 106 can elicit user response and thereafter wait for a preset or dynamically and/or contemporaneously determined amount of time. Should a user response fail to emanate within the preset or allotted threshold period, server 106 can proceed to install the client application without further user input. Nevertheless, regardless of whether user response is elicited and/or the decision to install dynamically determined by server 106, server 106 can distribute an executable file and commence installation of the client application software on client 102. Once installation of the client application has completed successfully, server 106 can cause relevant cookie strings and agent strings to be associated with and persisted on client 102, and thereafter client application can commence execution on client 102.

Figure 2:
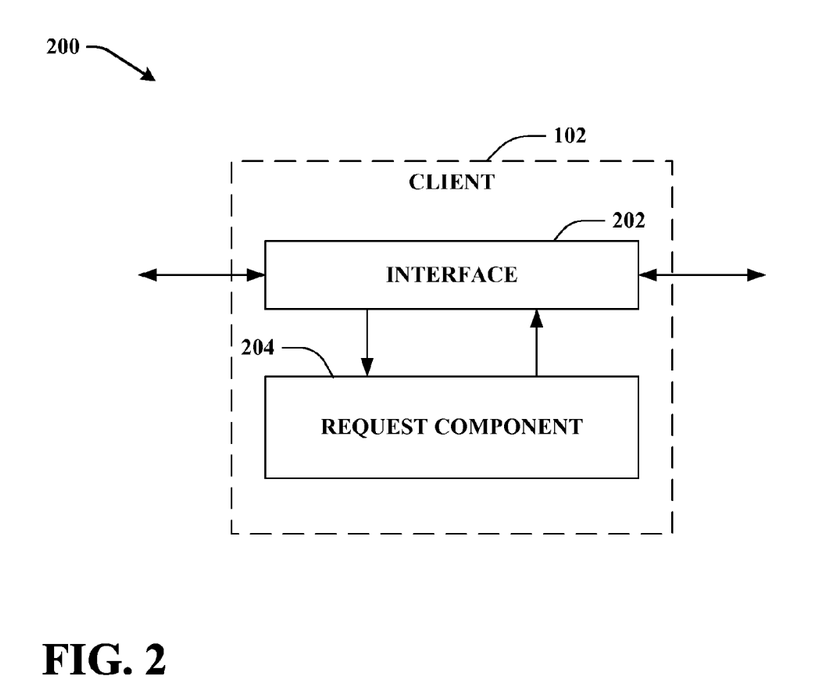
FIG. 2 provides a more detailed illustration of a client that can be utilized in accordance with one aspect of the claimed subject matter.

FIG. 2 provides illustration 200 of an illustrative client 102 that can be utilized in association with an aspect of the claimed subject matter. As illustrated client 102 can include interface component 202 (hereinafter referred to as "interface 202") that can communicate with server 106 via network topology 104. Additionally, client 102 can also include request component 204 that can construct and generate a request (e.g., Hyper Text Transfer Protocol (HTTP) request) for dissemination to server 106 via interface 202.

Interface 202 can receive data from a multitude of sources, such as, for example, data associated with a particular client application, service, user, client, and/or entity involved with a portion of the transaction, and thereafter convey the received information to request component 204 for further analysis. Additionally, interface 202 can receive request information from request component 204 which can then be communicated to server 106 via network topology 104.

Interface 202 can provide various adapters, connectors, channels, communication pathways, etc. to integrate the various components included in system 200 into virtually any operating system and/or database system and/or with one another. Additionally, interface 202 can provide various adapters, connectors, channels, communication modalities, etc. that provide for interaction with various components that can comprise system 200, and/or any other component (external and/or internal), data and the like associated with system 200.

Request component 204 prior to construction, generation, and dissemination of the request to server 106 can, for example, set up a frame in an invoking page executing on client 102. The frame typically can be periodically refreshed. The benefit of utilizing the frame within an invoking page is that only the frame need be periodically refreshed as further actions are performed, rather than the necessity of refreshing the whole invoking page. Additionally, request component 204 can set up a plurality of further frames within the invoking page. These frames can be utilized to display installation text, client application launch text, and/or associated information related to detection, launch, and/or installation of client application from server 106.

Figure 3:
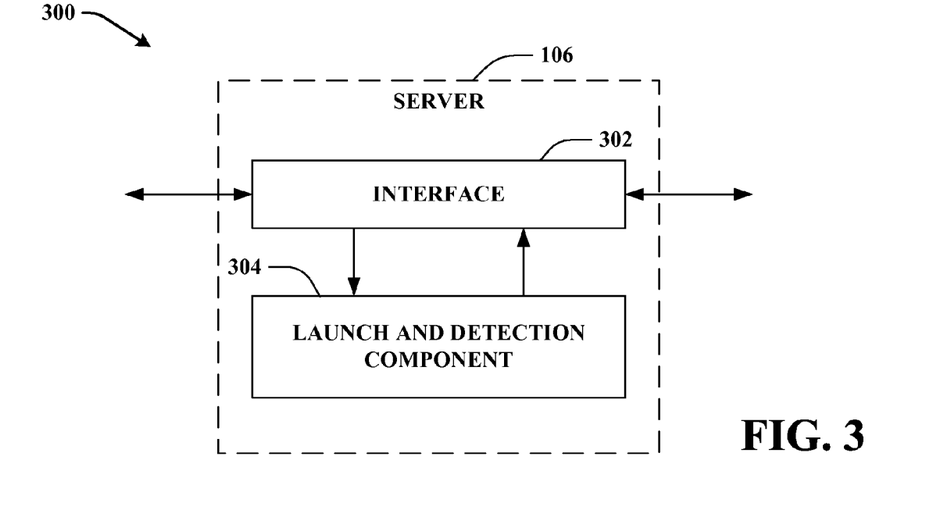
FIG. 3 illustrates a more detailed depiction of server that can be employed with an aspect of the claimed subject mater.

FIG. 3 depicts 300 an illustrative server 106 that can be utilized in relation with an aspect of the disclosed subject matter. As illustrated server 106 can include interface component 302 (hereinafter referred to as "interface 302") that can communicate with client 102 via topology 104, and can further avail the service of detection component 304 that can help detect, launch, and/or install client applications upon receiving a request from client 102 onto requesting client 102.

As discussed above in connection with interface 202, interface 302 can function in a similar fashion. Accordingly, for the sake of brevity, the full functionality of interface 302 will not be further discussed.

Launch and detection component 304 can perform a platform check, for example, launch and detection component 304 can determine whether client 102 has the appropriate hardware and software (operating system, drivers, patch levels, etc.) needed to execute client application on client 102. Launch and detection component 304 can determine whether client 102 is capable of executing the client application through use of support lists. Support lists can be persisted permanently and/or temporarily (e.g. in memory and/or in disk). Moreover, it will be understood by those conversant in the art that memory and/or other equivalent persisting means can be distributed over the entirety of network topology 104 and/or can be located in contiguous proximity of either client 102 and/or server 106. Additionally, it will be further recognized by those of ordinary skill that persisting means can be physically associated with server 106 as well as client 102.

Where launch and detection component 304 recognizes attributes and/or characteristics of requesting client 102 as existing in persisted support lists, launch and detection component 304 can perform various and sundry further tasks (discussed infra). Where launch and detection component 304 is unable to locate requesting client 102 in the persisted support lists, launch and detection component 304 can instigate server 106 to launch a console (e.g., Java console) on client 102, for instance. Where launch and detection component 304 identifies client 102 in one or more persisted support lists, launch and detection component 304 can investigate the HTTP request received from client 102 to ascertain whether the HTTP request contains an appropriate agent string necessary to launch, rather than install, client application. Where launch and detection component 304 finds an agent string, a formatted document of appropriate MIME type, can be distributed to client 102, and thereafter the client application can commence execution on client 102.

In contrast, where launch and detection component 304 is unable to locate an agent string associated with the HTTP request communicated by client 102, launch and detection component 304 can probe client 102 to discover whether client 102 contains and/or has had previously persisted a cookie and/or includes a MIME type appropriate to execute the client requested application. For instance, launch and detection component 304 can probe client 102 to reveal a "XY5555Installed" cookie string for example, which can cause launch and detection component 304 to induce server 106 to commence distribution of a formatted document of appropriate MIME type and subsequently application XY can commence execution on requesting client 102. Additionally and/or alternatively as a further example, launch and detection component 304 can probe client 102 to reveal a MIME type, for instance "application/vnd.abc.rtc" which can cause launch and detection component 304 to instigate server 106 to provide client 102 with a formatted document of appropriate MIME type, at which point client application can commence execution on client 102 shortly thereafter.

Where launch and detection component 304 is unable to detect an appropriate uses string, cookie, and/or MIME type, launch and detection component 304 can cause server 106 to effectuate an installation functionality that can elicited multiple responses from individuals utilizing and/or processes executing on client 102. Elicited information can include, for example, the location of client 102, preferred language for installation, and the like. It should be noted in the context of preferred language that when no appropriate response is forthcoming that a default language can be automatically selected based at least in part on the geographical location of client 102. For instance, if server 106 determines that client 102 is located in Montréal, Québec, server 106 can automatically deduce that an appropriate default language can be Canadian French, for example. Moreover, greater and/or lesser granularity with respect to regional dialect can be obtained based for example on data provided by client 102.

Once launch and detection component 304 has ascertained an appropriate language with which to install client application, and any other pertinent information that can be necessary and/or crucial to the seamless installation off client application with minimal user interaction, launch and detection component 304 can request user response as to whether or not client application should be installed on client 102. Where are response is forthcoming from a user, launch and detection component 304 can commence distributing executable code suitable for execution on client 102. Once execution code has been installed, or at least partially installed, client application can commence execution on client 102. Additionally and contemporaneously, and/or alternatively and subsequently, launch and detection component 304 can instigate server 106 to persist relevant cookie strings, agent strings, and/or MIME types on client 102 for future use by launch and detection component 304 to detect whether or not client application is present on client 102.

Figure 4:
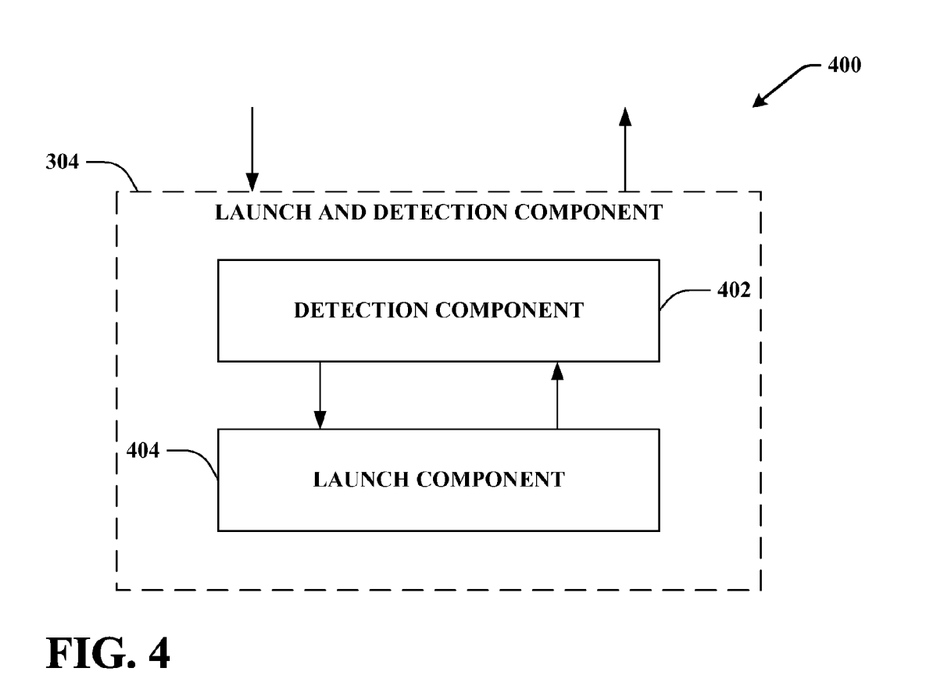
FIG. 4 provides a more detailed depiction of a detection and launch component in accordance with an aspect of the claimed subject matter.

FIG. 4 depicts 400 at illustrative launch and detection component 304 that can be employed by an aspect of the subject matter as claimed. As illustrated launch and detection component 304 can, for example, include a detection component or aspect 402 and a launch component or aspect 404. Detection component or aspect 402 can perform various platform checks based at least in part on HTTP request packets that have been received from client 102 requesting launch and/or installation of particular client applications. Platform checks can include operating system detection, service patch levels, memory and disk capacity, processor speed, display type, geographical location, time zone, display settings, and the like. Detection component or aspect 402 can utilize the aforementioned gleaned and/or deduced information to determine whether or not client 102 appears in one or more persisted support list. Additionally and/or alternatively, detection component 402 can determine whether agent strings occur in received HTTP request packets. Further, detection component for zero to can probe or cause client 102 to divulge cookie and/or MIME type information that can be resident on client 102. Such information can be utilized to determine whether or not client applications need to be installed (e.g., executable code distributed to client 102 for subsequent execution).

Launch component 404 can, when detection component 402 fails to locate pertinent attributes associated with client 102 and support list, launch a console (e.g., a Java console) to be displayed on client 102. Additionally, launch component 404 can respond to detection component 402 and distribute a formatted document of appropriate MIME type to client 102. Additionally and/or alternatively, when detection component 402 is unable to detect agent strings, launch component 404 can be utilized to cause client 102 to disclose information related to cookies and/or MIME types that can be previously persisted on client 102.

When detection component 402 is unable to detect an agent string, cookie and/or MIME type launch component 404 can effectuate and facilitate installation of client applications on client 102. In this regard, launch component 404 can elicit a multitude of responses from users and/or processes executing on client 102. Responses solicited from users can include language preferences, geographical locations of client 102, and the like. Once launch component 404 has obtained sufficient information related to client 102 and/or individual users and/or processes executing on, or expected to execute on, client 102, launch component 404 can distribute, or cause server 106 to disseminate, appropriate executable code to client 102. Once such executable code has been downloaded, or even partially downloaded, client application associated with downloaded and/or disseminated code can commence execution on client 102.

Figure 5:
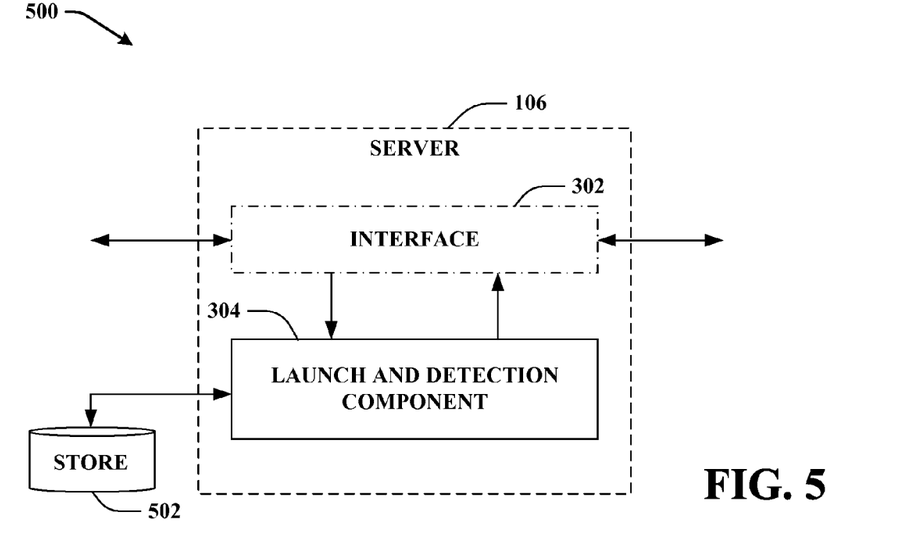
FIG. 5 illustrates a system implemented on a machine that detects, launches, and/or installs client applications in accordance with an aspect of the claimed subject matter.

FIG. 5 depicts an aspect of a detection, launch and installation system 500 that can include server 106 that can comprise interface 302 and launch and detection component 304. Additionally, system 500 can include store 502 that can include any suitable data necessary for launch and detection component 304 to detect, launch and/or install client applications on client machines. For instance, store 502 can include information regarding user data, data reletea to the service provided by the server e.g. meeting data, data related to a portion of a transaction, credit information, historic data related to a previous transaction, a portion of data associated with purchasing a good and/or service, a portion of data associated with selling a good and/or service, geographical location, online activity, previous online transactions, activity across disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from the disparate network, ratings from a website, a credit score, geographical location, a donation to charity, or any other information related to software, applications, web conferencing, and/or any suitable data related to transactions, etc.

It is to be appreciated that store 502 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM) and Rambus dynamic RAM (RDRAM). Store 502 of the subject systems and methods is intended to comprise, without being limited to, these and any other suitable types of memory. In addition, it is to be appreciated that store 502 can be a server, a database, a hard drive, and the like.

Figure 6:
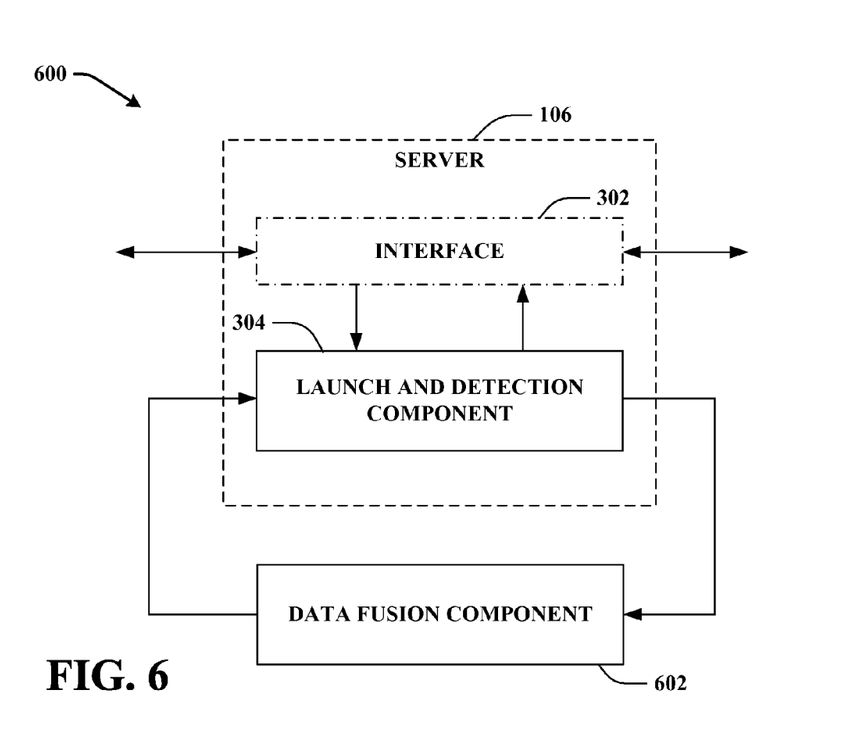
FIG. 6 provides a further depiction of a machine implemented system that detects, launches, and/or installs client applications in accordance with an aspect of the subject matter as claimed.

FIG. 6 provides yet a further depiction of a system 600 for facilitating and effectuating detection, launch and/or installation of client applications in accordance with an aspect of the claimed subject matter. As depicted, system 600 can include a data fusion component 602 that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed by data fusion component 602 may include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Figure 7:
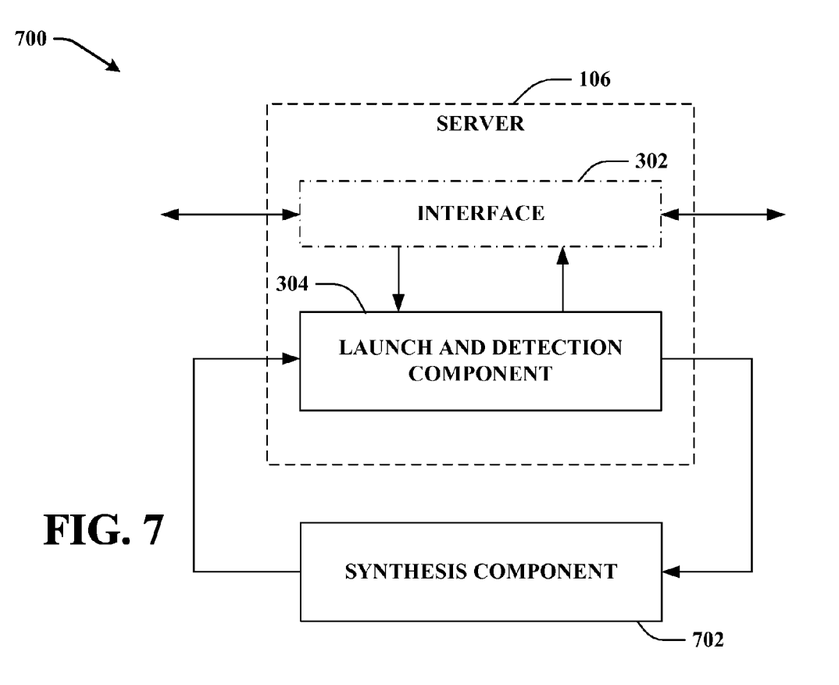
FIG. 7 illustrates yet another aspect of the machine implemented system that detects, launches, and/or installs client applications in accordance with an aspect of the claimed subject matter.

FIG. 7 provides a further depiction of a system 700 for facilitating and effectuating detection, launch and/or installation of client applications in accordance with an aspect of the claimed subject matter. As illustrated launch and detection component 304 can, for example, employ synthesizing component 702 to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Synthesizing component 702 through combining and filtering can provide a set of information that can be more informative, all accurate (e.g., with respect to an entity's communicative or informational goals) and information from just one or two modalities, for example. As discussed in connection with FIG. 6, the data fusion component 602 can be employed to learn correlations between different data types, and the synthesizing component 702 can employ such correlations in connection with combining, or filtering the input data.

Figure 8:
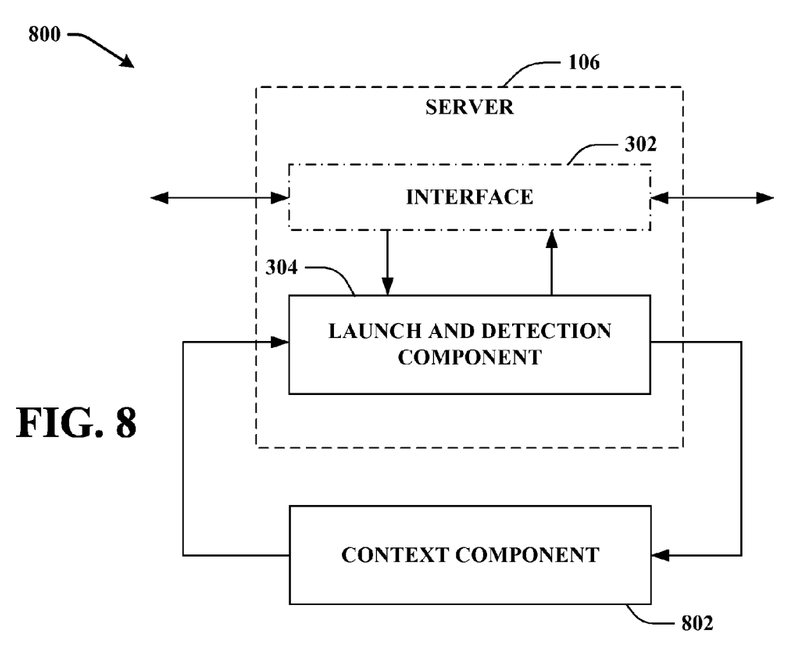
FIG. 8 depicts a further illustrative aspect of the machine implemented system that detects, launches, and/or installs client applications in accordance with an aspect of the claimed subject matter.

FIG. 8 provides a further illustration of a system 800 for facilitating and effectuating detection, launch and/or installation of client applications in accordance with an aspect of the claimed subject matter. As illustrated launch and detection component 304 can, for example, employ context component 802 to determine context associated with a particular action or set of input data. As can be appreciated, context can play an important role with respect to understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context component 802 can provide current or historical data in connection with inputs to increase proper interpretation of inputs. For example, time of day may be helpful to understanding an input—in the morning, the word "drink" would likely have a high a probability of being associated with coffee, tea, or juice as compared to be associated with a soft drink or alcoholic beverage during late hours. Context can also assist in interpreting uttered words that sound the same (e.g., steak and, and stake). Knowledge that it is near dinnertime of the user as compared to the user campaign would greatly help in recognizing the following spoken words "I need a steak/stake". Thus, if the context component 802 had knowledge that the user was not camping, and that it was near dinnertime, the utterance would be interpreted as "steak". On the other hand, if the context component 802 knew (e.g., via GPS system input) that the user recently arrived at a camping ground within a national park; it might more heavily weight the utterance as "stake".

In view of the foregoing, it is readily apparent that utilization of the context component 802 to consider and analyze extrinsic information can substantially facilitate determining meaning of sets of inputs.

Figure 9:
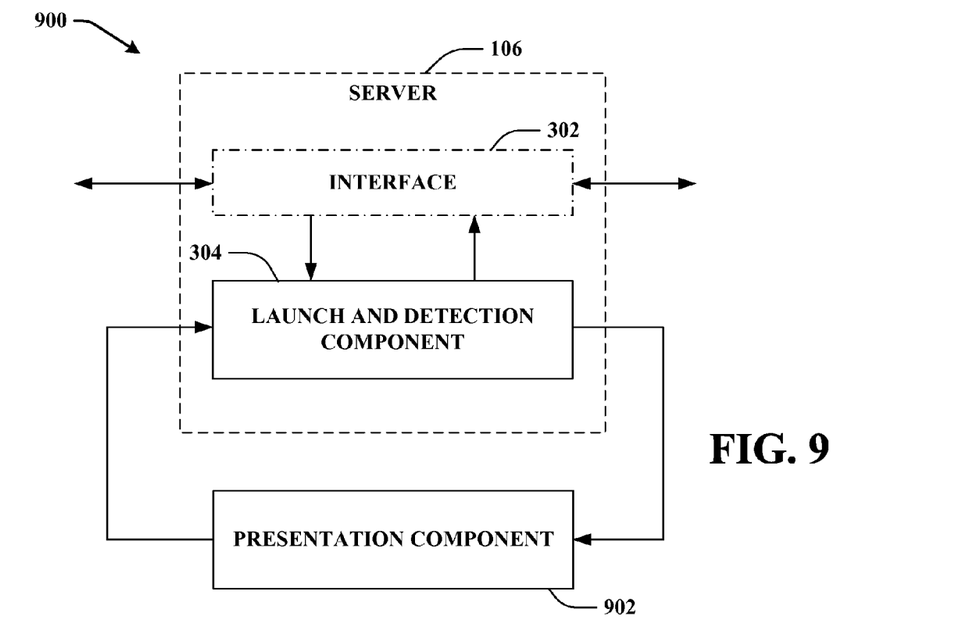
FIG. 9 illustrates another illustrative aspect of a system implemented on a machine that detects, launches, and/or installs client applications in accordance of yet another aspect of the claimed subject matter.

FIG. 9 a further illustration of a system 900 that facilitates and effectuates detection, launch and/or installation of client applications in accordance with an aspect of the claimed subject matter. As illustrates, system 900 can include presentation component 602 that can provide various types of user interface to facilitate interaction between a user and any component coupled to launch and detection component 304. As illustrated, presentation component 902 is a separate entity that can be utilized with launch and detection component. However, it is to be appreciated that presentation component 902 and/or other similar view components can be incorporated into launch and presentation component 304 and/or a standalone unit. Presentation component 902 can provide one or more graphical user interface, command line interface, and the like. For example, the graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed. For example, the user can interact with one or more of the components coupled and/or incorporated into launch component 304.

Users can also interact with regions to select and provide information via various devices such as a mouse, roller ball, keypad, keyboard, and/or voice activation, for example. Typically, the mechanism such as a push button or the enter key on the keyboard can be employed subsequent to entering the information in order to initiate, for example, a query. However, it is to be appreciated that the claimed subject matter is not so limited. For example, nearly highlighting a checkbox can initiate information conveyance. In another example, a command line interface can be employed. For example, the command line interface can prompt (e.g., via text message on a display and an audio tone) the user for information via a text message. The user can then provide suitable information, such as alphanumeric input corresponding to an option provided in the interface prompt or an answer to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 10:
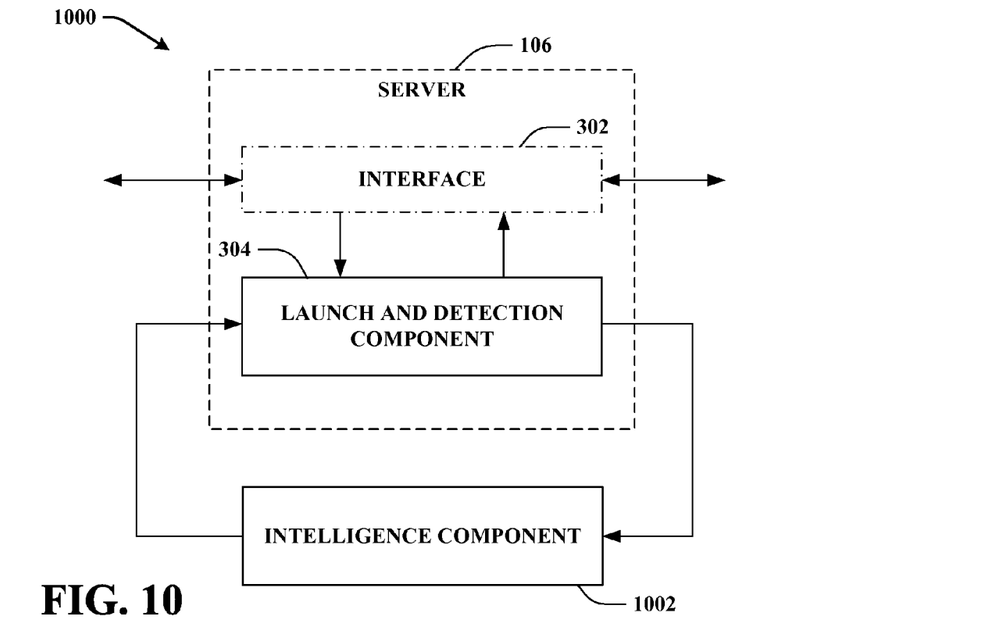
FIG. 10 depicts yet another illustrative aspect of a system that detects, launches, and/or installs client applications in accordance with an aspect of the subject matter as claimed.

FIG. 10 depicts a system 1000 that employs artificial intelligence to facilitate and effectuate detection, launch and/or installation of client applications in accordance with an aspect of the subject matter as claimed. Accordingly, as illustrated, system 1000 can include an intelligence component 1002 that can be utilized, for example, to dynamically ascertain one or more of threshold wait times, and/or respective locations of client 102 and server 106. Intelligence component 1002 can employ a probabilistic based or statistical based approach, for example, in connection with making determinations or inferences. Inferences can be based in part upon explicit training of classifiers (not shown) before employing system 100, or implicit training based at least in part upon system feedback and/or users previous actions, commands, instructions, and the like during use of the system. Intelligence component 1002 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. Intelligence component 1002 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

In view of the exemplary systems shown and described supra, methodologies that may be implemented in accordance with the disclosed subject matter will be better appreciated with reference to the flow charts of FIG. 11-14. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

Figure 11:
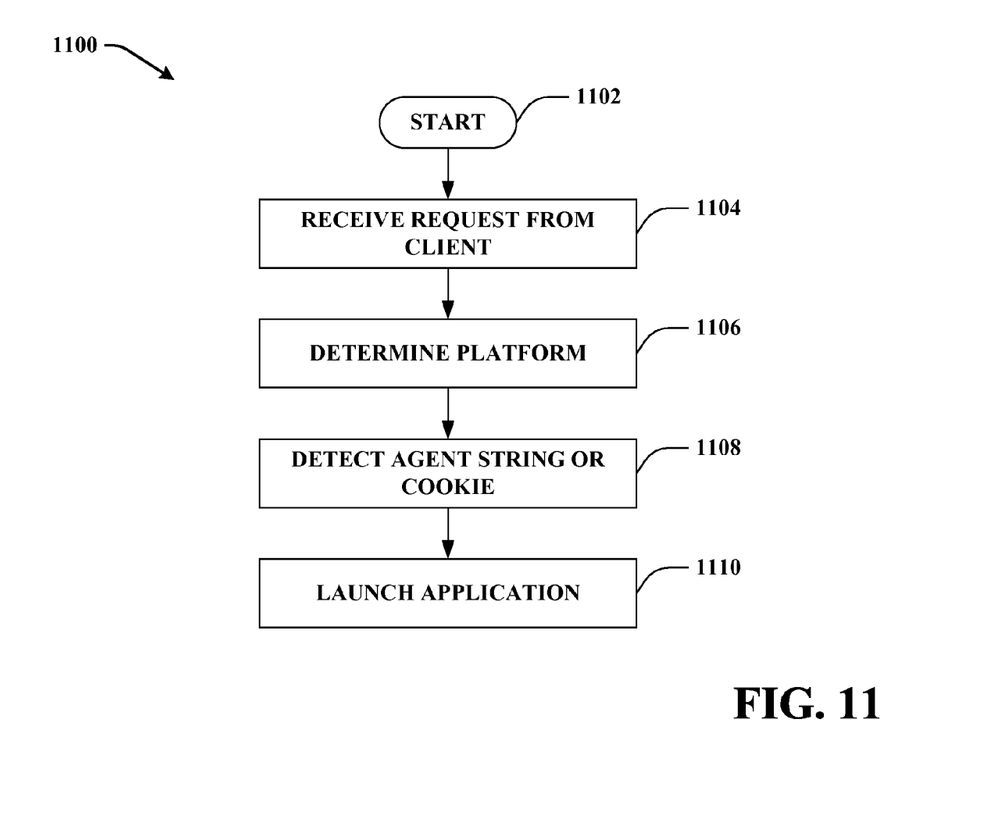
FIG. 11 illustrates a flow diagram of a machine implemented methodology that facilitates and effectuates a detection, launch and/or installation system in accordance with an aspect of the claimed subject matter.

FIG. 11 provides an illustrative flow diagram illustrating a method 1100 that facilitates and effectuates detection, launch and/or installation of client applications in accordance with an aspect of the claimed subject matter. The method commences at 1102 where various and sundry initializations can take place after which the method can proceed to 1104. At 1104 a request, for example, an HTTP request can be received from a client. Upon receipt of the request the methodology can perform platform checks (e.g., operating system, service patch level, memory and disk capacity, processor speed, display type, geographical location, time zone information, display settings, etc.) based at least in part on the received HTTP request packets, and thereafter proceed to 1106. At 1106 the methodology can receive from client (e.g., client 102) information regarding agent string, cookies, and/or MIME type.

Such information gleaned at 1104 and 1106 can be used to determine whether or not the client application should be launched and/or installed on the client, and further the particular platform specific client application that should be launched and/or installed. Once determination has been made as to whether the client application should be launched and/or installed on the client, and the particular platform specific client application should be distributed and/or installed, the client application can, at 1110, commence execution on the client.

Figure 12:
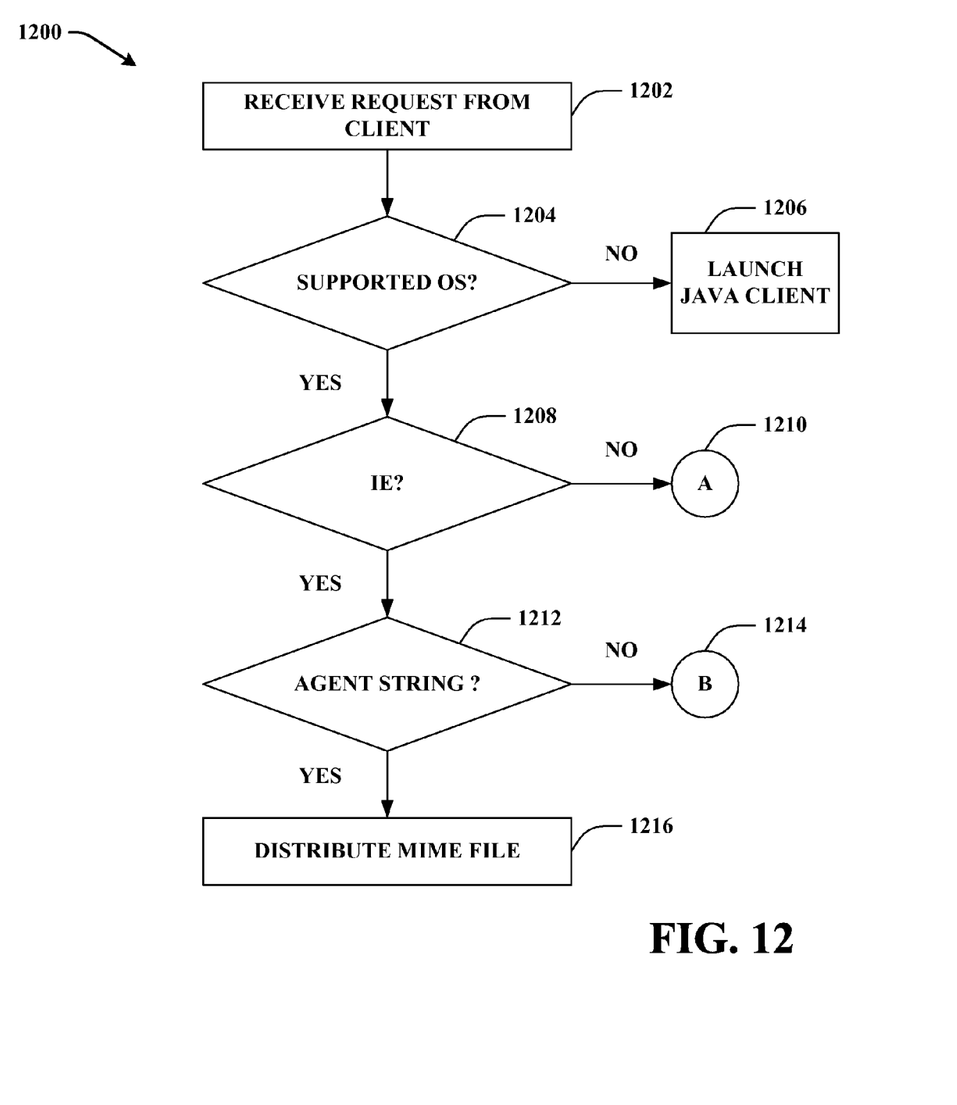
FIG. 12 illustrates a flow diagram of a machine implemented methodology that facilitates and effectuates a detection system in accordance with an aspect of the claimed subject matter

FIG. 12 illustrates a machine implemented methodology in accordance with an aspect of the claimed subject matter. As illustrated, methodology 1200 detects an incoming request from a client for the launch and/or installation of a client application at 1202. Upon receipt of the request from client at 1202 the methodology proceeds to 1204 at which point determination is made as to whether the client platform is supported (e.g., is contained in a support list). Where the platform type is found to be supported (e.g., YES), methodology 1200 can proceed to 1208, alternatively where is determined at 1204 that the platform is not supported (e.g. NO) the method proceeds to 1206 whereupon a java client can be spawned and/or displayed on the client and pertinent information can be elicited from the individual using the client, and/or the process/application attempting to launch the client application. At 1208 determination is made for the browser and if it is found to be IE the method proceed to 1212 alternatively if it is determined at 1208 that the browser is not IE the method proceed to 1210 where further processing is performed. At 1212 the method can ascertain from the received request whether or not an agent string has been associated with the request. If an agent string has been associated with the received request (e.g., YES), methodology 1200 can proceed to 1216, otherwise the method proceeds to 1214 where further processing can be performed. At 1214 a determination is made as to whether or not the requesting client contain and/or has had previously persisted a cookie that includes a MIME type appropriate to execute the requested application. If it is determined that a cookie with an associated MIME type has been persisted (e.g., YES), the method proceeds to 1216 whereupon a formatter document of appropriate MIME types can be distributed to the requesting client at which point the client application can commence execution on the client. Where at 1212 a cookie is not discoverable, method 1200 can proceed to 1214 where further processing can be undertaken.

Figure 13:
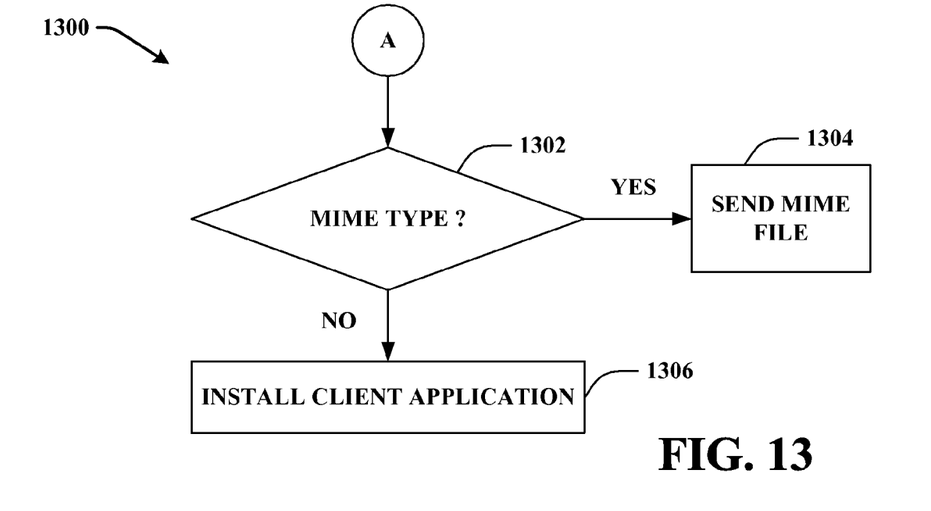
FIG. 13 depicts a flow diagram of a machine implemented method that can be utilized with an aspect of the claimed subject matter.

FIG. 13 provides further illustration 1300 of a machine implemented method in accordance with an aspect of the claimed subject matter. As depicted, method 1300 determines at 1302 whether or not a MIME type of the form "application/vnd.abc.rtc" is resident and/or is associated with a requesting client. Where it is determined that a MIME type has been previously associated on the requesting client, method 1300 can proceed to 1304 whereupon a formatted document of appropriate MIME types can be distributed to the requesting client at which point the client application can commence execution on the client. Where it is ascertained that an appropriate MIME type string has not previously been persisted and/or associated with the requesting client, method 1300 can proceed to 1306 whereupon installation of client application can take place. Installation of client application at 1306 can include automatically ascertaining an appropriate installation language based on user locale where the individual employing requesting client is logged in, or otherwise the installation process can utilize the client's putative locale. Where the client's locale is not evident, the installation can default to a default language (e.g., English). Upon completion of the installation process at 1306 the installed application can commence execution on the client.

Figure 14:
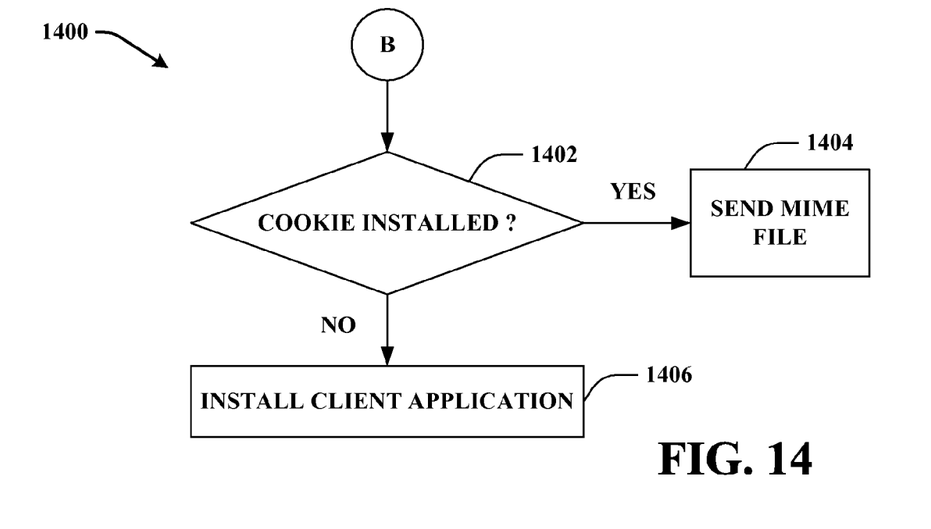
FIG. 14 illustrates a further machine implemented methodology that be employed with an aspect of the claimed subject matter.

FIG. 14 illustrates a further machine implemented methodology in accordance with a further aspect of the claimed subject matter. As illustrated, method 1400 determines at 1402 whether or not a cookie has been previously persisted on the requesting client. Where it is ascertain that a cookie has been previously persisted, method 1400 can proceed to 1404 whereupon a formatted document of appropriate MIME types can be distributed to the requesting client at which point the client application can commence execution on the client. On the other hand, where it is ascertained that a cookie has not been previously persisted on requesting client, method 1400 can proceed to 1406 whereupon installation of client application can take place. Installation of client application at 1406 can include automatically determining an appropriate installer language based on the user locale if the individual using the requesting client is logged in, otherwise, the installation process can employ the client's putative locale. Where the client's putative locale is unknown the installation process can default to English. Once the installer language has been determined, executable files can be served out to the client and the client application installed on the client. Prior to completion of the installation a cookie can be installed on the client. It should be noted that concurrently with the installation of the client application, cookie detection can take place to facilitate automatic launch of client application once the installation is complete.

Figure 15:
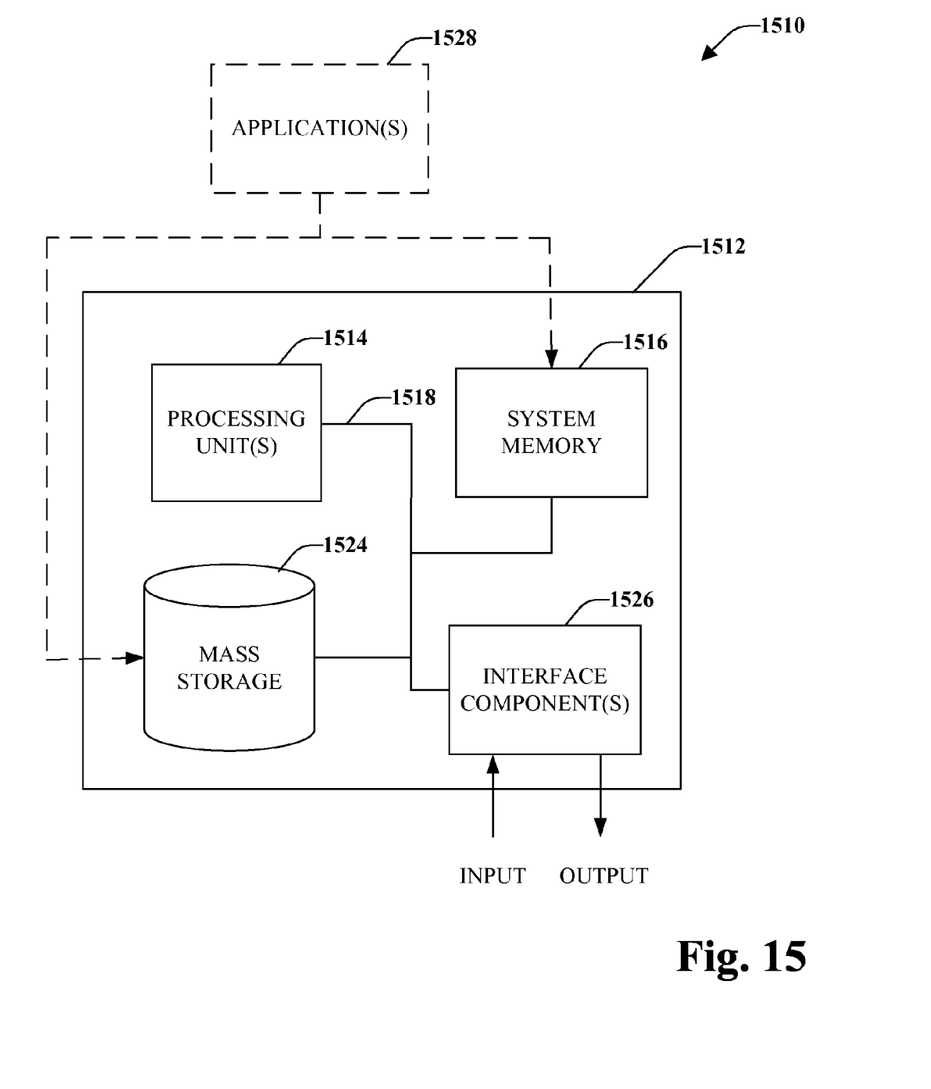
FIG. 15 illustrates a block diagram of a computer operable to execute the disclosed detection, launch, and/or installation of client application system in accordance with an aspect of the claimed subject matter.
Figure 16:
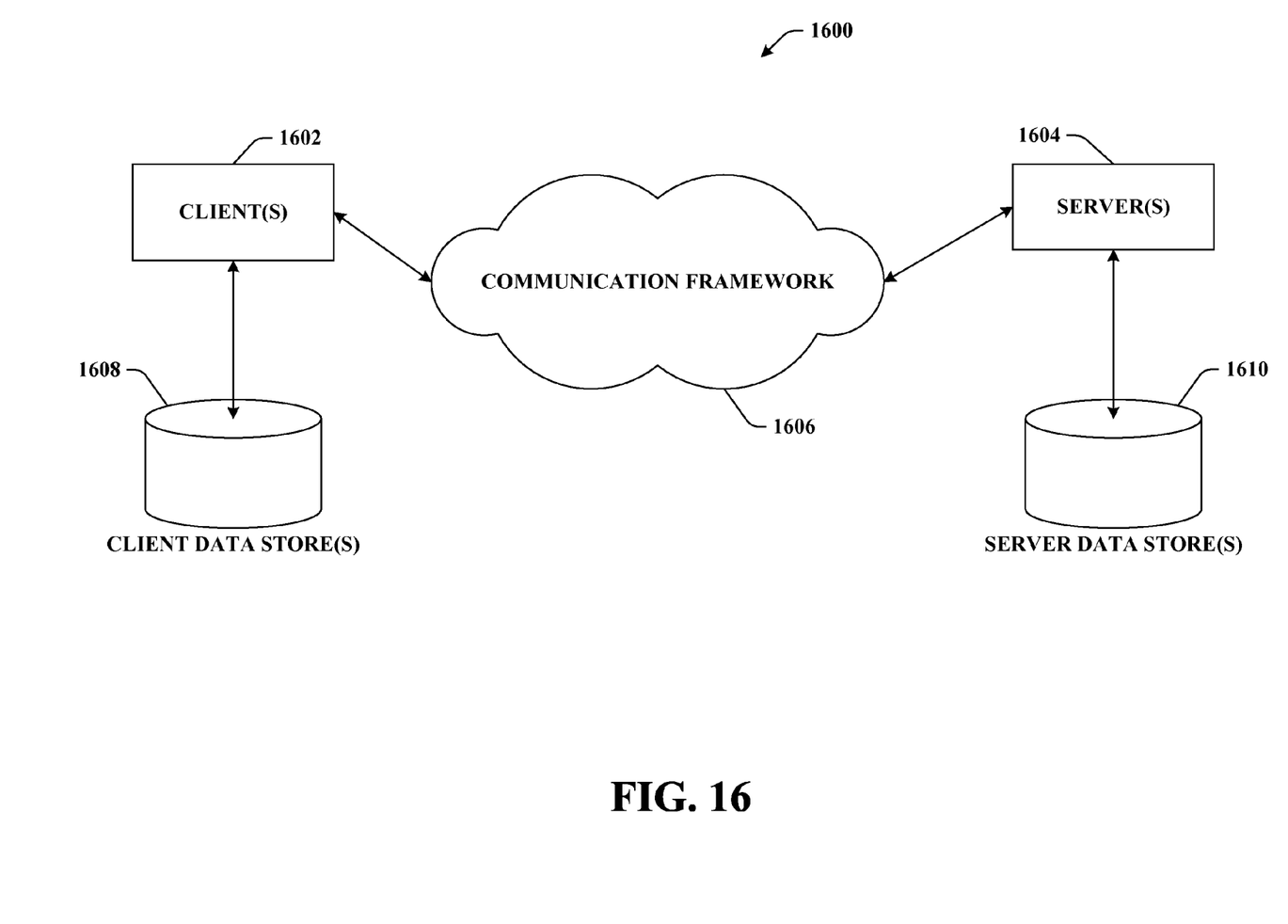
FIG. 16 illustrates a schematic block diagram of an exemplary computing environment for processing the detection, launch, and/or installation of client application architecture in accordance with another aspect.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 15, an exemplary environment 1510 for implementing various aspects disclosed herein includes a computer 1512 (e.g., desktop, laptop, server, hand held, programmable consumer or industrial electronics . . . ). The computer 1512 includes a processing unit 1514, a system memory 1516, and a system bus 1518. The system bus 1518 couples system components including, but not limited to, the system memory 1516 to the processing unit 1514. The processing unit 1514 can be any of various available microprocessors. It is to be appreciated that dual microprocessors, multi-core and other multiprocessor architectures can be employed as the processing unit 1514.

The system memory 1516 includes volatile and nonvolatile memory. The basic input/output system (BIOS), containing the basic routines to transfer information between elements within the computer 1512, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1512 also includes removable/non-removable, volatile/non-volatile computer storage media. FIG. 15 illustrates, for example, mass storage 1524. Mass storage 1524 includes, but is not limited to, devices like a magnetic or optical disk drive, floppy disk drive, flash memory or memory stick. In addition, mass storage 1524 can include storage media separately or in combination with other storage media.

FIG. 15 provides software application(s) 1528 that act as an intermediary between users and/or other computers and the basic computer resources described in suitable operating environment 1510. Such software application(s) 1528 include one or both of system and application software. System software can include an operating system, which can be stored on mass storage 1524, that acts to control and allocate resources of the computer system 1512. Application software takes advantage of the management of resources by system software through program modules and data stored on either or both of system memory 1516 and mass storage 1524.

The computer 1512 also includes one or more interface components 1526 that are communicatively coupled to the bus 1518 and facilitate interaction with the computer 1512. By way of example, the interface component 1526 can be a port (e.g., serial, parallel, PCMCIA, USB, FireWire . . . ) or an interface card (e.g., sound, video, network . . . ) or the like. The interface component 1526 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1512 to output device(s) via interface component 1526. Output devices can include displays (e.g., CRT, LCD, plasma . . . ), speakers, printers and other computers, among other things.

Referring now to FIG. 16, there is illustrated a schematic block diagram of an exemplary computing environment 1600 for processing the disclosed architecture in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the claimed subject matter, for example.

The system 1600 also includes one or more server(s) 1604. The server(s) 1604 can also be hardware and/or software (e.g., threads, processes, computing devices). The servers 1604 can house threads to perform transformations by employing the claimed subject matter, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that at least one of detects, launches, or installs client applications on client machines, comprising:
a component that receives from an interface a request to launch or install a client application,
the component configured to determine whether an agent string affiliated with the client application is associated with the request,
the component further configured to determine whether a client machine that provides the request at least one of includes or has persisted a cookie,
the component further configured to determine whether the client machine has at least one of persisted or been associated with a MIME type,
the component further configured to distribute a formatted document affiliated with the client application and to cause the client application to commence execution on the client machine in response to detection of at least one of the agent string, the cookie, or the MIME type,
the component further configured to distribute an executable file associated with the client application in response to a failure to detect the agent string, the cookie, and the MIME type,
execution of the executable file at least one of generates the agent string, generates the cookie, or registers a MIME type handler.

2. The system of claim 1, the component scrutinizes the request and causes the client machine to divulge existence of the cookie;
wherein the cookie is a browser cookie associated with the client application.

3. The system of claim 2, based at least in part on the browser cookie the component disseminates the formatted document associated with the client application and causes the client application to execute on the client machine.

4. The system of claim 1, the component analyzes the request and initiates a process to execute on the client machine and return an indication of a MIME type associated with the formatted document.

5. The system of claim 4, based at least in part on the MIME type the component distributes the formatted document to the client application and ensures the client application commences execution on the client machine.

6. The system of claim 1, execution of the executable file generates the agent string, the cookie and registers a MIME type handler.

7. The system of claim 6, the agent string, the cookie and the MIME type distributed and persisted on the client machine.

8. The system of claim 6, the agent string, the cookie, or the MIME type provides future indication to the component that the client application is extant on the client machine.

9. The system of claim 6, the component ensures the executable file associated with the client application is installed on the client application, before the client application is completely installed the client machine can commence execution of the executable file.

10. The system of claim 1, the component utilizes the request to determine a locale or location of the client machine or an operating system version extant on the client machine.

11. The system of claim 1, the component effectuates a console to be displayed on the client machine based at least in part on information contained in the request.

12. The system of claim 1, the component employs the request to determine an installation language preference.

13. A method implemented on a machine that at least one of detects, launches or installs client applications, comprising:
   receiving from an interface a request to launch or install an application;
   determining that an agent string affiliated with the application is not associated with the request;
   determining whether at least one of a cookie at least one of included in or persisted by a client machine that provides the request or (b) a MIME type at least one of persisted by or associated with the client machine is identified in response to determining that the agent string is not associated with the request;
   if the at least one of the cookie or the MIME type is identified, distributing a formatted document affiliated with the application and causing the application to commence execution on the client machine; and
   if the at least one of the cookie or the MIME type is not identified, distributing an executable file associated with the application, execution of the executable file at least one of generating the agent string, generating the cookie, or registering a MIME type handler.

14. The method of claim 13, further includes distributing or initiating code on the client machine, the code causes the client machine to return persisted browser cookie information associated with the cookie.

15. The method of claim 14, the persisted browser cookie information utilized to initiate execution of the application on the client machine.

16. The method of claim 13, further includes retrieving from the client machine the MIME type and utilizing the MIME type to instigate the client machine to commence execution of the application on the client machine.

17. The method of claim 13, further includes creating and persisting a user-agent string, a MIME type association for a particular file extension with the application and a browser cookie on the client machine.

18. The method of claim 13, wherein the application is launched to the client machine in response to distributing the formatted document.

19. The method of claim 13, wherein the application has access to system resources and is not dependent on a second application to execute on the client machine.

20. A computer storage device that stores program modules that, when executed, enable a processor-based system to at least one of detect, launch or install client applications, the program modules comprising:
   a first program module that enables the processor-based system to determine whether an agent string affiliated with a client application is associated with a request to launch or install the client application;
   a second program module that enables the processor-based system to determine whether a client machine that provides the request at least one of includes or has persisted a cookie;
   a third program module that enables the processor-based system to determine whether the client machine has at least one of persisted or been associated with a MIME type;
   a fourth program module that enables the processor-based system to distribute a formatted document affiliated with the client application and to cause the client application to commence execution on the client machine in response to detection of at least one of the agent string, the cookie, or the MIME type;
   a fifth program module that enables the processor-based system to distribute an executable file associated with the client application in response to a failure to detect the agent string, the cookie, and the MIME type,
   execution of the executable file at least one of generates the agent string, generates the cookie, or registers a MIME type handler.

* * * * *